Feb. 3, 1953 P. M. ANGELL ET AL 2,627,236
APPARATUS FOR MANUFACTURING ICE-CREAM
CAKE ROLLS AND THE LIKE
Filed April 23, 1949 5 Sheets-Sheet 4
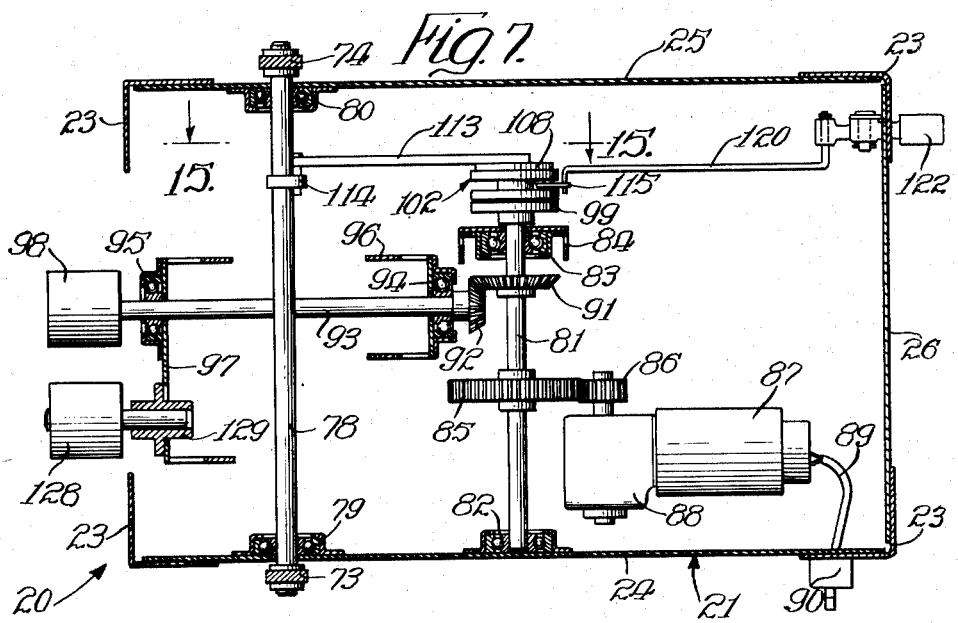
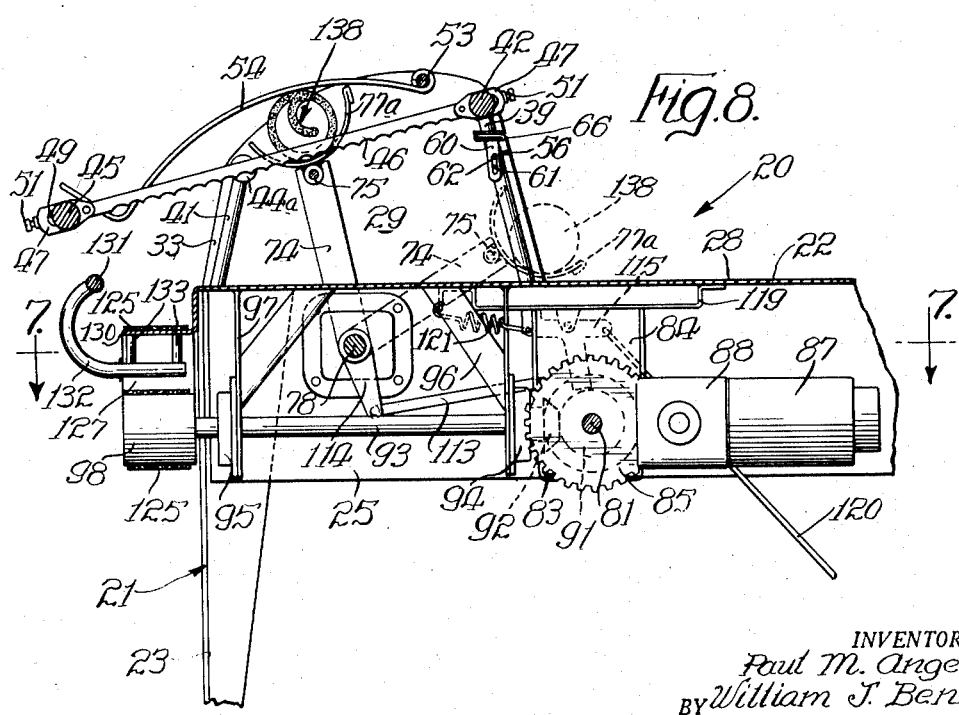
INVENTORS:
Paul M. Angell
BY William J. Benn
Kegan and Kegan
Attys.

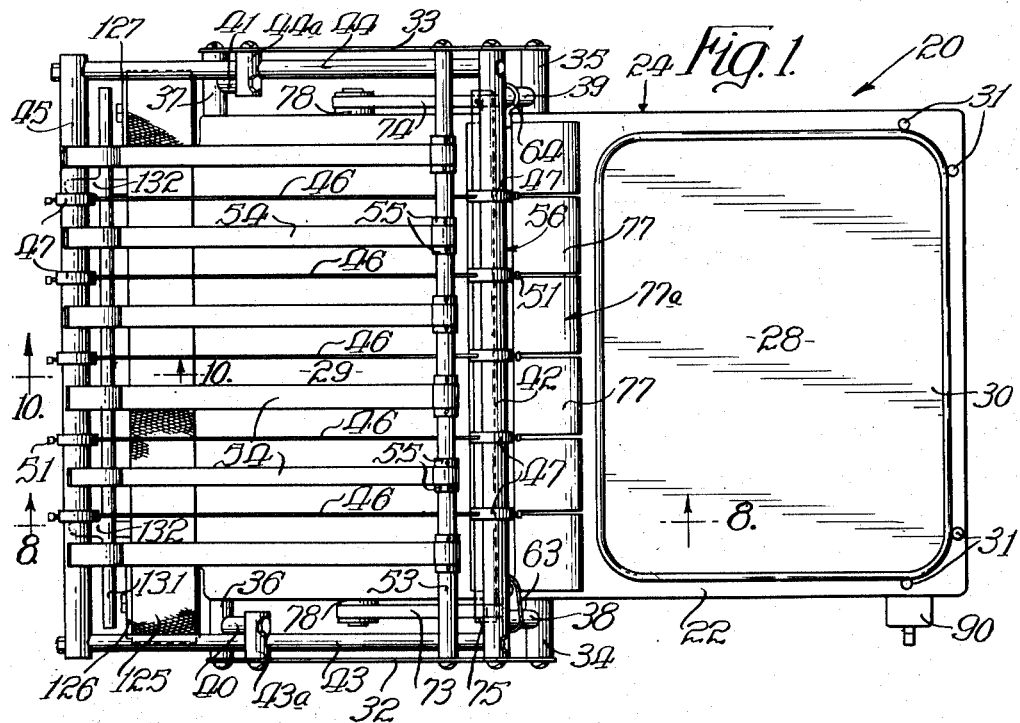
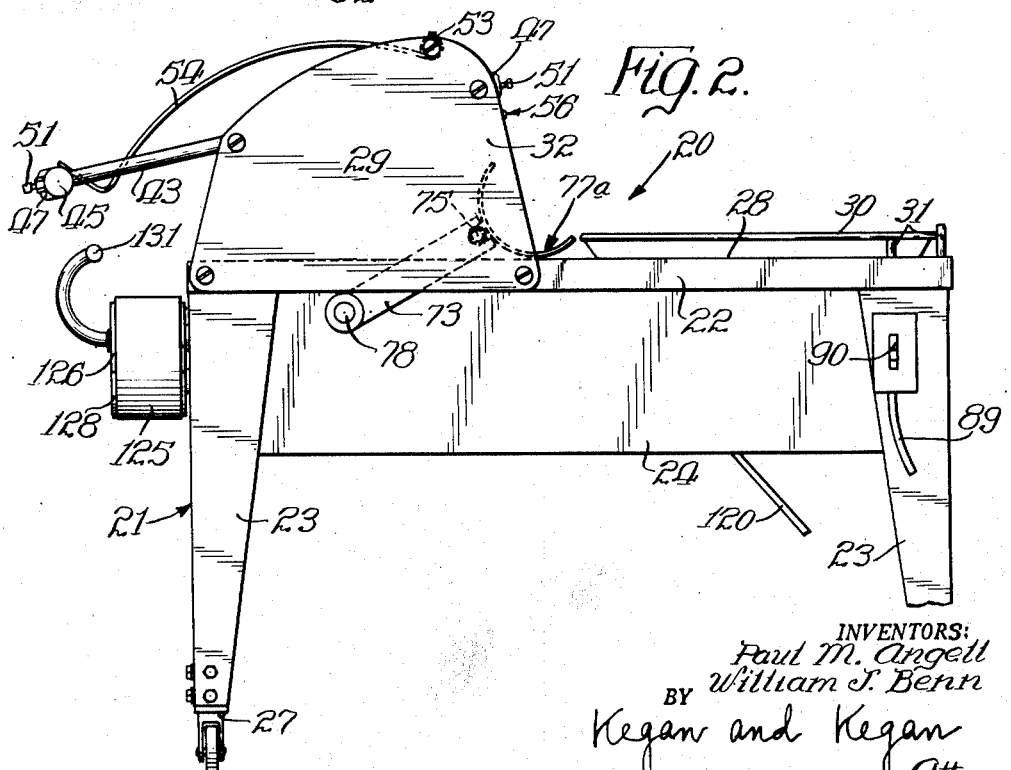

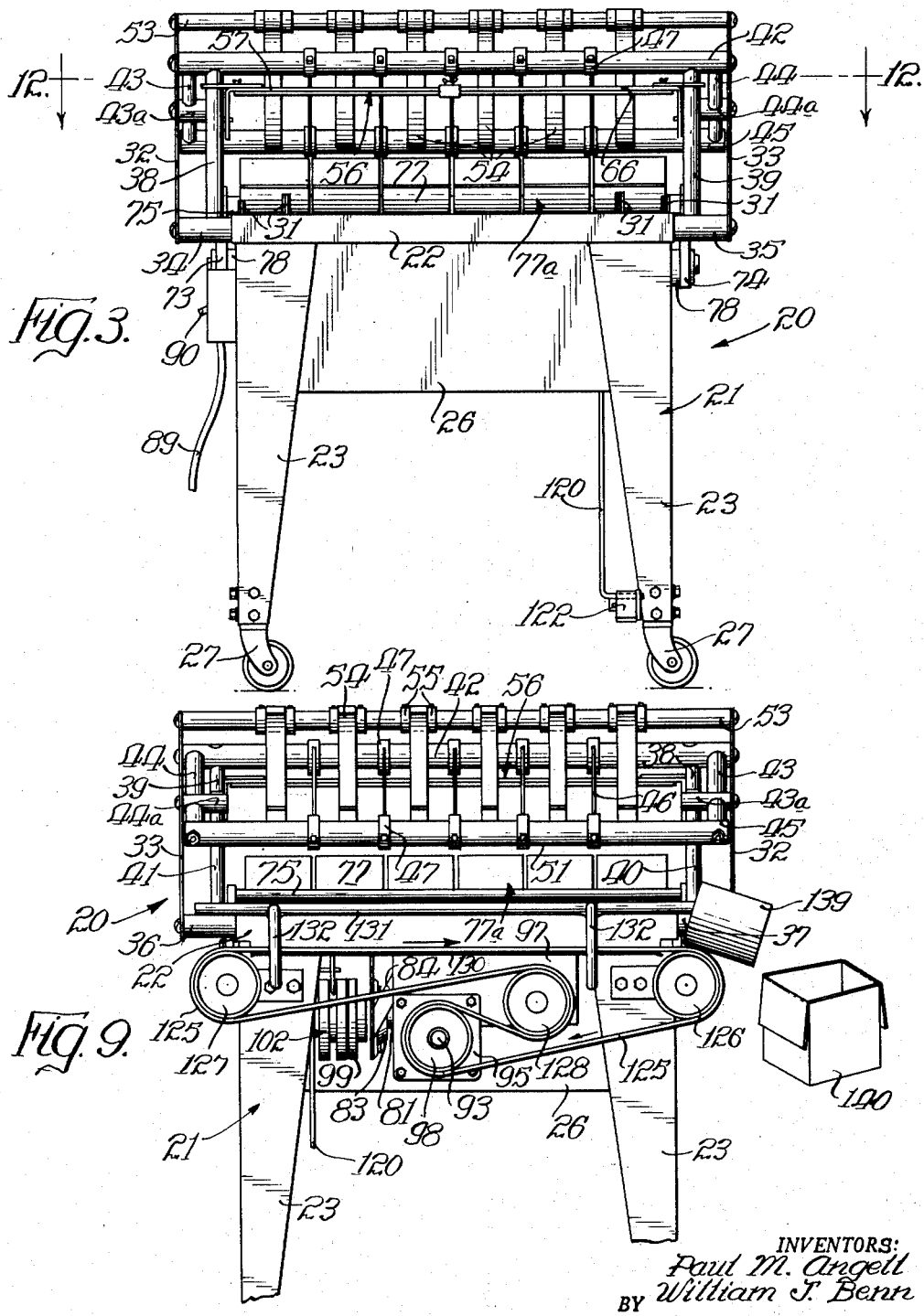

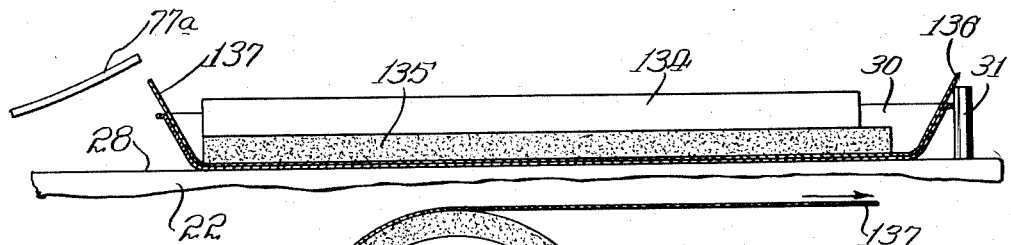
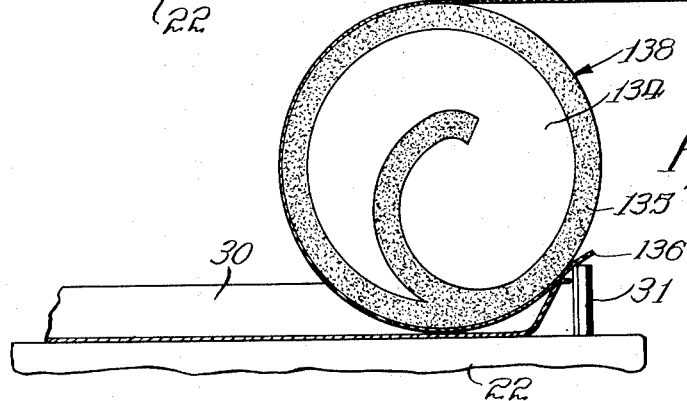
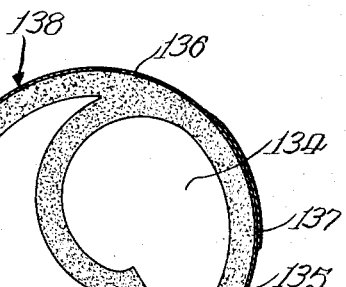
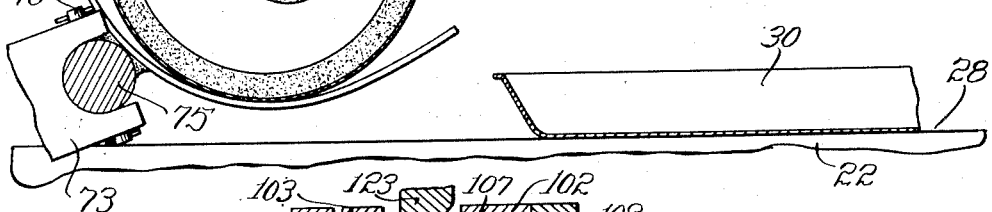

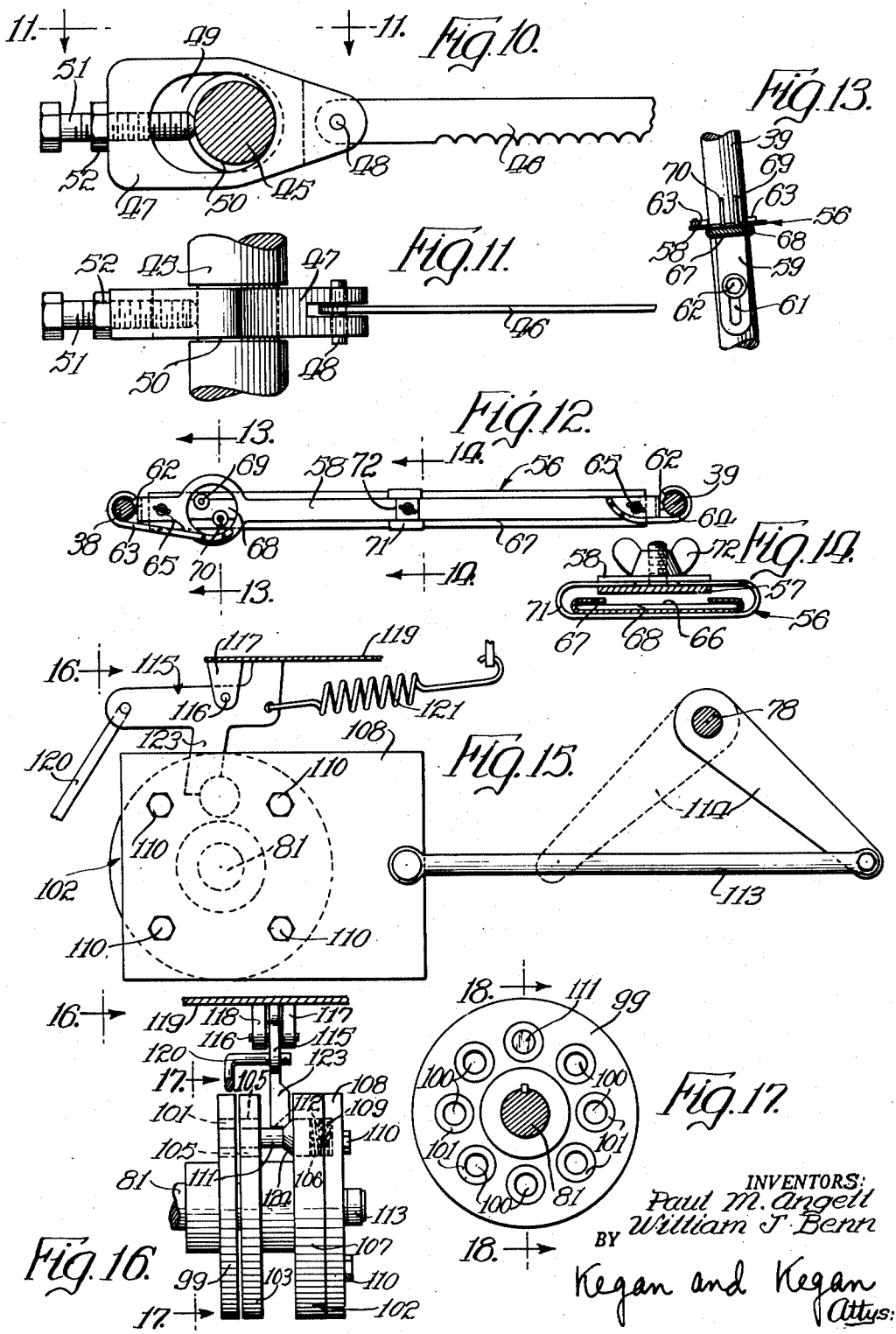

Patented Feb. 3, 1953

2,627,236

UNITED STATES PATENT OFFICE 2,627,236

APPARATUS FOR MANUFACTURING ICE-CREAM CAKE ROLLS AND THE LIKE

Paul M. Angell and William J. Benn, Chicago, Ill., assignors to Newly Weds Baking Co., Chicago, Ill., a corporation of Illinois Application April 23, 1949, Serial No. 89,297

4 Claims. (Cl. 107—21)

Our invention relates generally to improvements in apparatus for dividing relatively soft, resilient or mushy material into pieces of predetermined size and shape.

More particularly, and in the form shown in the accompanying drawings, our invention relates to apparatus specially adapted to be used in the wholesale manufacture of composite confectionery products such as ice cream cake rolls.

The problem of assembling, forming, cutting and packaging such confectionery products in an efficient, sanitary manner has long confronted the confectionery art. The principal difficulty has centered around the inadequate apparatus for cutting or otherwise severing the wholesale unit of confection into retail portions. Before our invention it was considered essential that the cutting operation be carried out only when the ice cream or other frozen comestible was frozen solid. As a result, it was necessary to use heavy machines capable of exerting the cutting force required to part the frozen, hard material. The operating characteristics of these machines in general compared favorably with those of band-saws and circular saws of the type commonly used to cut wood, ice and plastics. Because of the high blade speed of these machines, and the relatively low speed with which the work was fed past the blades, the cut surfaces of the baked goods forming part of the confection were burnished and smeared over. Thus the porosity of the baked goods, so necessary to the good taste of baked goods of this type, was destroyed at the cutting interfaces; consequently the retail portions were rendered less tasty than is the case where the baked goods are gently pulled or broken apart. The burnished appearance of the baked goods also made the retail portions less attractive in appearance.

Another major disadvantage present in the prior art manufacture of ice cream cake rolls and like confections was the use of various machines at widely separated stations for performing only one step each of the process. Thus, the frozen comestible and bakery goods typically were assembled at one station; rolled, folded or otherwise formed at another station; and then removed to yet a third station, where the confection was refrigerated until ice hard. The cutting of the confection into portions of retail size was carried out at yet a fourth station, after which the cut portions were usually hand wrapped and packaged at another station before being returned to the refrigerated room for storage. The large amount of handling involved is apparent. Furthermore, to expedite production, the confection usually was handled and cut without having any protective covering wrapped about it. Because of this and the long period of time during which the confection was exposed to the air, it was most difficult to keep the food clean and wholesome.

A principal object of our invention therefore is to provide compact machinery whereby ice cream cake confection or the like may be assembled, formed, cut, wrapped and packaged all within the space of a few minutes' time, with a minimum of handling, and without being touched by human hands.

Another object of the present invention is to provide machinery capable of quickly and efficiently dividing relatively soft and plastic foods, as exemplified by semi-frozen ice cream and spongy cake, into pieces of predetermined size and shape without damaging or making less palatable any of said foods.

Another object is to provide apparatus of the type specified, of simple, inexpensive and rugged construction.

In its broad aspect, our invention comprises machinery which provides a sequence of stations and functions, including a first station at which a length of confection is assembled and formed, a cutting station at which the confection is divided into a plurality of retail pieces of desired size and shape, transporting means adapted to convey the confection from the first station through the cutting station, conveying means on to which the cut sections of confection are discharged by the transporting means, and a packaging station at which the cut sections are individually packaged. In one useful modification of our invention, a sealing station may be added whereby waxed paper or other heat sealable protective covering material previously wrapped about the confection, may be permanently sealed in place.

In practice, the subcombination comprising the cutting station may include one or more stationary cutting members, while the transporting means may comprise a rotatable member positioned such that the cutting members form, in effect, chords of the arc described by the rotatable member upon movement thereof through the cutting station. By means of appropriate drive means, the machinery may be made to operate in a highly automatic manner in which handling of the food product by human hands is eliminated.

In order that our invention may be more fully disclosed, reference is had to the accompanying drawings which illustrate one form of apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that our invention is not restricted to the particular details recited in the specification or shown in the drawings.

In the drawings:

Figure 1 is a plan view of a machine embodying our invention;

Figure 2 is a side elevational view of the same;

Figure 3 is a front elevational view of the same;

Figures 4-6 illustrate succeeding steps in a preferred method of assembling and forming one type of confectionery product which may be manufactured by means of our invention;

Figure 7 is a longitudinal sectional view taken substantially on line 7—7 of Figure 8, showing the drive mechanism of the apparatus of Figure 1;

Figure 8 is a side elevational view taken in section on the line 8—8 of Figure 1, and illustrates the manner in which the confection shown in Figure 6 is translated with respect to the cutting members of the apparatus;

Figure 9 is a rear elevational view illustrating the manner in which the individual pieces of confection are conveyed, following the cutting operation, to a packaging or loading station;

Figure 10 is a detailed side elevational view on an enlarged scale, taken in section on the line 10—10 of Figure 1, and illustrates the manner in which the cutting members of the apparatus are secured in place;

Figure 11 is a fragmentary plan view taken on the line 11—11 of Figure 10;

Figure 12 is a detailed plan view taken in section on the line 12—12 of Figure 3, and illustrates the sealing means used for securing in place a protective wrapping previously placed about the confection;

Figure 13 is a fragmentary detail view taken in section on the line 13—13 of Figure 12;

Figure 14 is a detail view taken in section on the line 14—14 of Figure 12;

Figure 15 is a fragmentary side elevational view taken in section on the line 15—15 of Figure 7, showing portions of the driving gear mechanism comprising the embodiment shown;

Figure 16 is a front elevational view taken on the line 16—16 of Figure 15;

Figure 17 is a fragmentary side elevational view taken in section on the line 17—17 of Figure 16; and Figure 18 is a cross sectional view on the line 18—18 of Figure 17, showing details of the clutch mechanism.

Like reference characters designate like parts in the drawings and in the description of the invention which follows.

Construction of apparatus

Referring now to the drawings, our apparatus is shown to be in the form of a portable machine 20. The frame 21 of the machine 20 is shown as including a top 22, vertical legs 23 at each corner of the top 22, side aprons 24 and 25 and a front apron 26 suitably enclosing the drive mechanism (described below), and a caster 27 for each leg 23 whereby the machine 20 may be conveniently moved about.

The upper surface of the top 22 (Figures 1 and 2) is divided into a forming and assembling station indicated generally by the numeral 28, and a cutting station indicated generally by the numeral 29. The forming and assembling station 28 is adapted to receive a tray 30 of conventional construction, which is properly located by means of a plurality of studs or locating pins 31. The cutting station 29 is contained between the two side shields 32 and 33, which enclose the cutting apparatus and which prevent the operator from getting his hands or clothing caught in the moving machinery.

Referring now to Figures 1, 3 and 9, the side shields 32 and 33 are secured to an upper frame comprised of a pair of lower, front horizontal bars 34 and 35, lower rear horizontal bars 36 and 37, a pair of front, substantially vertical posts 38 and 39, a pair of rear, substantially vertical posts 40 and 41, a front cross piece 42 extending between the posts 38 and 39, rearwardly extending side pieces 43 and 44, and a rear cross piece 45 extending between the two rearward ends of the side pieces 43 and 44. The inner ends of the bars 34—37 inclusive are fixed in the longitudinal edges of top 22. A pair of spacers 43a and 44a connect the side pieces 43 and 44 to the rear posts 40 and 41, respectively.

The front and rear cross pieces 42 and 45 provide support for the cutting members, which are shown in Figures 8, 10 and 11 as comprising a plurality of saw blades 46 each end of which is pinned to its respective member 47 by a pin 48. Each of the members 47 includes a central opening 49 adapted to slip over the cross piece 45 (or 42), and is of such width that it fits within the groove 50 in the cross piece 45 (or 42), in the manner shown. The saw blades 46 are held in place by the tensioning bolt 51, while the nut 52 locks the bolt 51 in place after the desired degree of tension has been obtained.

The saw blade 46 may be observed from Fig. 10 to comprise flat hardened steel ribbons with lowermost edges ground to provide scalloped knife edges. The cutting action which is performed by such blades upon the soft, spongy cake and ice cream rolls, has been found to rip or tear to a significant extent throughout the roll composition rather than, as in the case of other arrangements, to compress, pack and smear.

Positioned between the side shields 32 and 33 at the upper portions thereof is a cross bar 53. As best shown in Figures 1, 2 and 9, a plurality of curved plates 54 are hingedly secured to the cross bar 53, and are held at the desired position along the cross bar 53 by means of spacer collars 55. The free ends of the curved plates 54 normally rest upon the rear cross piece 45, and are limited to swing upwardly from this normal null position. The utility of these curved plates 54 will become more apparent as this exposition proceeds.

Also positioned between the side shields 32 and 33 is a sealing mechanism 56. As is best shown in Figures 3, 12 and 13, the sealing mechanism 56 comprises a supporting member 57 having a horizontal portion 58, and two downwardly extending legs 59 and 60. As shown in Figure 13, each of the legs 59 and 60 contains a slot 61 through which a supporting bolt 62 extends to the respective vertical post 38 or 39. Curved guide strips 63 and 64 secured to the two ends of the horizontal portion 58, respectively, extend to and around the vertical posts 38 and 39. Because of the strips 63 and 64, the supporting member 57 may be deflected upwardly along the vertical posts 38 and 39, but cannot pivot about the bolts 62. Slung beneath the horizontal portion 58, and secured thereto by means of bolts provided with the thumb screws 65, 65 is a heater element 66 comprised of an outer shield 67 and an inner electrical resistor element 68. Said element 68 is energized through the electrodes 69 and 70 connected to a suitable source of electric current. As best shown in Figure 14, additional support is given to the heater element 66 by the thin metal band 71 secured to the horizontal portion 58 by means of the fastener 72.

Extending upwardly from the frame 21, and on opposite sides of the top 22, is a pair of arms 73 and 74 (Figures 1 and 2). A cross piece 75 is secured to the upper ends of the arms 73 and 74 by a pair of pins 76, 76. A plurality of curved plates 77 formed from thin metal, are welded or otherwise secured to the cross piece 75 in the manner best shown in Figure 6 and form a trough-shaped transporting member 77a. Sufficient space is left between each of the curved plates 77 so that the saw blades 46 will not interfere with the member 77a when the latter intersects the plane defined by the lower, cutting edges of the blades 46.

Referring now to Figures 7 and 8, the mechanism for driving the arms 73 and 74 includes a drive shaft 78 journaled by the ball bearings 79 and 80 and keyed at the two outer ends thereof to the arms 73 and 74, respectively. A second shaft 81 substantially parallel to the drive shaft 78 is supported by the ball bearings 82 and 83, the bearing 83 being secured to a hanger 84 hung from the top 22 of the frame 21. A bull gear 85 is secured to the shaft 81, and meshes with the pinion gear 86 drivably connected to the electric motor 87 through the gear reduction unit 88. Energy to drive the electric motor 87 is supplied through the conduit 89 and is switched on or off by means of the switch 90 (see Figure 2).

Also secured to the shaft 81 is a first bevel gear 91. A second bevel gear 92 meshed with the bevel gear 91 drives the shaft 93, which shaft is rotatably supported by the ball bearings 94 and 95 secured to the hangers 96 and 97, respectively. A drive pulley 98 is keyed to the end of the shaft 93 opposite the bevel gear 92. Thus, there is a direct drive connection between the electric motor 87 and the drive pulley 98.

Keyed to the shaft 81 is a face plate 99 comprising a part of the clutch mechanism (see Figures 16 and 17). The plate 99 includes a plurality of holes 100, spaced at regular intervals (45 degrees in Figure 17) along a locating circle concentric with the shaft 81. Inserted within each of the holes 100 is a sleeve bushing 101. Also carried on the end of the shaft 81 but freely rotatable thereabout, is a double face plate assembly 102. As is shown in Figures 15-18, the plate 103, which is integrally formed on one end of the hub of assembly 102 adjacent to the face plate 99, includes a hole 104 provided with a bushing 105. A second hole 106, in the plate 107 on the other end of said hub is in axial alignment with the hole 104. Affixed to the plate 107 is a substantially rectangular plate 108 (Figure 15) provided with a recess 109 which aligns with the hole 106 upon securing the plate 108 to the plate 107 by means of the bolts 110. As is best shown in Figures 16 and 18, a drive pin 111 is slidable within the holes 104 and 106, and is urged toward the plate 99 by the spring 112. One end of the connecting rod 113 is pivotably connected to the plate 108 eccentrically of the shaft 81; the other end of the connecting rod 113 being pivotably connected to the crank 114 which in turn is keyed to the drive shaft 78.

Our invention also includes clutch release mechanism which operates upon the drive pin 111. This is shown in Figures 7, 15 and 16 as including a trip arm 115 pivotably secured by the pin 116 to a pair of ears 117 and 118 extending downwardly from a plate 119 secured to bottom face of top 22. A control link 120 adapted to rotate the trip arm 115 about the pin 116 against the resistance of the spring 121, is operated through a foot release pedal 122. A trip cam 123 extends from the trip arm 115 and is adapted to engage the conical portion 124 of the drive pin 111.

The machine 20 is further provided with conveyor mechanism adapted to convey the cut portions of the confectionery product to a packaging or loading station. As is best shown in Figure 9, taken in conjunction with Figures 7 and 8, the conveyor mechanism includes an endless, flexible belt 125 driven by the drive pulley 98. The upper span of the belt 125 is defined by the two idler pulleys 126 and 127. The tension of the belt 125 is adjusted by moving the bearing support 129 of the pulley 128 relative to the hanger 97. A plate 130 extends from the top 22 and provides a supporting surface for the upper span of the endless belt 125. The bar 131 acts as a guard rail to prevent the confection from rolling off of the pulley 126, said bar 131 being supported by the curved members 132 secured to the plate 130 by means of the spacers 133.

*Operation of apparatus*

In using our invention, the operator first closes the switch 9, thereby energizing the drive motor 87 and causing the shaft 81 and the shaft 93 to rotate. As the shaft 93 rotates, the endless belt 125 is driven in the direction shown by the directional arrow of Figure 9. However, while the shaft 81 is rotating, the double face plate assembly 102 remains stationary, i. e. idles on the shaft 81, since the drive pin 111 is held in the position shown in Figure 16 by the trip 123. This position is maintained by the action of the spring 121, until such time as the foot release pedal 122 is actuated. When the machine 20 is in this idling position, the arms 73 and 74 and the member 77a, are in the position best shown in Figures 1 and 2, and remain in this position since there is no driving connection between the shaft 81 and the drive shaft 78.

While our machine is useful in the production of confections of many types, by way of illustrating the utility of our apparatus, it is shown in connection with the manufacture of an ice cream cake confection of the type shown in Patent No. 2,214,917, issued to Paul M. Angell on September 17, 1940, and entitled Method of Manufacture of Composite Ice Cream Cake. Such confection is initially assembled as a two-ply composite of ice cream 134 and cake 135 and thereafter formed at the assembling and forming station 28. As further shown in Figure 4, this initial operation includes the step of spreading or depositing a layer of freshly made, semi-frozen ice cream 134 upon a slab of cake 135, which in turn rests upon a sheet of waxed paper 136. Following this, and as shown in Figure 5, the composite of Figure 4 is rolled into a cylindrical length of confection of more or less spiral cross section, by pulling the end 137 of the waxed paper 136 in the direction shown. Immediately following this operation, the roll 138 of confection is positioned at that end of the tray 30 farthest from the member 77a. The operator next rolls the roll 138 in the reverse direction, or toward the transporting member 77a, thereby wrapping the waxed paper 136 about the roll 138, as shown in Figure 6. Figure 6 also shows the appearance of the roll 138 after having been loaded onto the member 77a preparatory to the cutting operation.

Following the step of loading the roll 138 onto the member 77a, the operator depresses the foot release pedal 122, thereby causing the trip arm 115 to rotate against the resistance of the spring 21, and to move the trip cam 123 away from the drive pin 111. As this is done, the spring 112 drives the drive pin 111 toward and into engagement with one of the bushings 101 in the flanged plate 99. This creates a drive connection between the plate 99 and the double face plate assembly 102, causing the plate 108 to rotate and thereby deflect the crank 114. As is shown in Figure 15, the plate 108, the connecting rod 113, and the crank 114 are proportioned so that one complete revolution of the plate 108 causes the crank 114 to oscillate to and fro through an included angle of approximately 100 degrees. As the crank 114 moves clockwise, the roll 138 is first moved into brush contact with the heater element 66 of the sealing mechanism 56. This contact between the heater element 66 and the overlapping portion of the waxed paper 136 is only momentary and of a time duration sufficient to cause the two ends of the waxed paper 136 to seal together. Because the supporting member 57 is free to move upwardly along the vertical posts 38 and 39, there is no interference with the free movement of the arms 73 and 74 and the member 77a. Further, this adjustment feature of the sealing mechanism 56 permits effective sealing of the waxed paper 136 regardless of chance small differences in the diameter of successive rolls 138 processed through the machine 20.

As the crank 114 continues to move clockwise through about 55 degrees of travel (Figure 15), the arms 73 and 74 are rotated into the position shown in Figure 8. During travel of the member 77a to this position, the roll 138 is moved along and progressively against the saw blades 46. At the same time, the roll 138 undergoes rotational translation due to the rocking of the arms 73 and 74 about the axis of the shaft 78. The combined motions imparted to the roll 138 result in a highly efficient cutting of the soft, resilient confection. Because of the soft consistency of both the cake 135 and the ice cream 134, there is little resistance to this cutting action. Advantageously, it has been found that the porous cake 135 is actually torn apart by the saw blades 46, rather than being compressed and sheared, so that both the appearance and palatability of the confectionery product are improved, for the reasons explained above.

It will be observed that when the roll 138 is in the position of Figure 8, the curved plates 54 are displaced upwardly from the null position illustrated in Figure 2. Thus, the weight of the curved plates 54 bears upon the roll 138 and assists in holding said roll 138 firmly in place within the member 77a. In addition, the curved plates 54 act to guide the cut portions 139 of the roll 138 onto the conveyor belt 125.

As the drive mechanism continues to turn the crank 114 clockwise, the arms 73 and 74 continue to move counterclockwise (Figure 8) until the full stroke of the connecting rod 113 is reached. At this point, the cut portions 139 of the roll 138 are dumped onto the endless belt 125. As the plate 108 continues to rotate, the arms 73 and 74 return to the position shown in Figure 1. Meanwhile, the operator has released the foot release pedal 122, so that the trip 123 has been pulled back by the spring 121 to the normal or null position shown in Figure 15. Therefore, when the plate 107 completes one full revolution, the tapered tip of the trip 123 contacts the conical portion 124 of the drive pin 111, and moves the pin 111 to the right, as viewed in Figures 16 and 18. The cranks 73 and 74 thereupon automatically come to a stop, and the machine is again set in the idling position, so that the operator can load a second roll 138 onto the member 77a. During the oscillation of the arms 73 and 74, the operator can be preparing another roll 138 of confection; hence there is no lost time during which the operator is idle.

After the cut portions 139 of the roll 138 have been placed upon the endless belt 125, they are conveyed to the right, as viewed in Figure 9. As each cut portion 139 is discharged from the endless belt 125, it may be conveniently dumped into or placed within the carton or package 140. After the package 140 is sealed, it is then removed to a cold storage room. During storage the ice cream 134 can be hardened to the extent desired.

It will thus be apparent that we have invented novel apparatus which is especially well adapted to the preparation and manufacture of confection of the type illustrated in Figures 4–6. Besides being highly automatic in its operation, our apparatus permits great savings in the length of time required to prepare and to cut the confection, compared with the most advanced prior art devices. At the same time, our invention eliminates any necessity for the operator handling or in any way manipulating the food product with his hands, and provides means for heat sealing a protective layer of waxed paper about the confection, if desired.

Having thus disclosed our novel cutting apparatus, and demonstrated its utility, we claim:

1. Machinery for making ice cream cake rolls and like confections, comprising: a pair of upright members spaced laterally from each other, a cross piece between said upright members, a plurality of parallel, uniformly spaced saw blades extending rearwardly and downwardly from said cross piece, a pair of spaced-apart rocker arms reciprocable about an axis parallel to said cross piece between start and discharge positions, said axis being spaced beneath and to the rear of said cross piece, a member connecting together the free ends of said arms, and adapted to move toward and adjacent to said saw blades during the forward movement of said arms, a plurality of curved plates secured to said member and adapted to receive and cradle a length of said confection, adjacent ones of said plates having spaces therebetween and forming a slotted trough adapted to admit said saw blades therebetween upon rotation of said rocker arms, drive means connected to said arms and adapted to reciprocate said member relative to said saw blades, clutch means associated with said drive means and adapted to disengage said drive means when said member returns to said start position, said length of confection being placed within said trough formed by said curved plates when said member is at said start position, means for engaging said clutch means to drive said rocker arms, whereby said length of confection cradled by said curved plates is moved against and along said saw blades and whereby said confection is severed into sections upon said rocker arms reaching said discharge position, at which position said arms reverse their direction of movement, and conveyor means adjacent said discharge position onto which said severed sections of said confection are discharged.

2. In apparatus for manufacturing ice cream cake confection and the like, cutting means comprising: a plurality of spaced, stationary, parallel saw blades, a first member rotatable beneath said saw blades, a trough-shaped member secured to said first member and slotted to traverse said saw blades without interference upon rotation of said first member, said trough-shaped member being adapted to receive and transport said confection along and against said saw blades, drive means adapted to oscillate said first member, and clutch means adapted to disengage said drive means after one complete cycle of oscillation of said first member.

3. In apparatus as defined in claim 2, a plurality of pivoted plates positioned above said saw blades and adapted to ride upon and press against said confection during cutting of the latter.

4. In machinery for manufacturing ice cream cake confection and the like, cutting apparatus comprising: one or more stationary saw blades; and means adapted to transport said confection along and against said saw blades, and simultaneously slowly rotate said confection relative to said blades, said means comprising a rotatable member, driving means for said member, and a carrier member secured to said member and adapted to receive and support said confection; said driving means comprising a shaft, means for rotating said shaft, a crank member turnable on said shaft, a connecting rod between said crank member and said rotatable member, said rotatable member being adapted to oscillate through an included angle of approximately 100 degrees upon one revolution of said crank member, clutch means between said shaft and said crank member, means for causing said clutch means to drivably connect said shaft to said crank member, and other means for disengaging said clutch means after one revolution of said crank member.

PAUL M. ANGELL.
WILLIAM J. BENN.

REFERENCES CITED

The following references are of record in the file of this patent:

UNITED STATES PATENTS

| Number | Name | Date |
|---|---|---|
| 1,013,903 | Shaw | Jan. 9, 1912 |
| 1,487,068 | Kuhn | Mar. 18, 1924 |
| 1,688,668 | Sorensen | Oct. 23, 1928 |
| 1,833,266 | Schultz | Nov. 24, 1931 |
| 1,882,139 | Giuffre | Oct. 11, 1932 |
| 1,925,143 | Hartman | Sept. 5, 1933 |
| 1,969,004 | Hartman | Aug. 7, 1934 |
| 1,993,466 | VanBerkel | Mar. 5, 1935 |
| 2,027,257 | Vogt | Jan. 7, 1936 |